Dec. 30, 1924.
F. J. RANKIN
1,520,885
PROCESS OF AND APPARATUS FOR OXIDIZING CARBON COMPOUNDS
Filed June 9, 1921
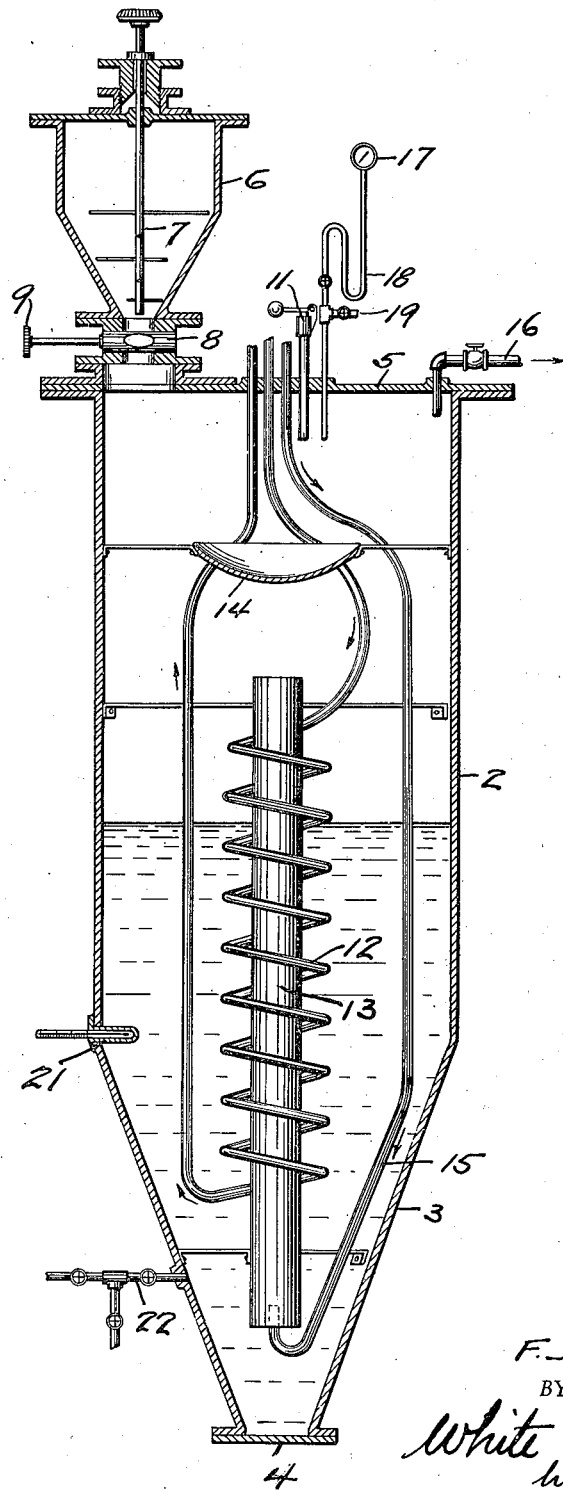
WITNESS
INVENTOR
F. J. RANKIN
BY
ATTORNEYS Patented Dec. 30, 1924.

1,520,885

UNITED STATES PATENT OFFICE.

FORREST J. RANKIN, OF ST. LOUIS, MISSOURI.

PROCESS OF AND APPARATUS FOR OXIDIZING CARBON COMPOUNDS.

Application filed June 9, 1921. Serial No. 476,240.

*To all whom it may concern:*

Be it known that I, FORREST J. RANKIN, a citizen of the United States, and a resident of St. Louis, county of St. Louis, and State of Missouri, have invented a new and useful Process of and Apparatus for Oxidizing Carbon Compounds, of which the following is a specification.

The invention relates to a process and apparatus of oxidizing carbon compounds, such as sugars, starches, cellulose, fructose and woody fiber, for the production of acids, such as oxalic, tartaric and glycollic acids and relates particularly to the treatment of rice hulls and other hulls for the production of oxalic acid.

An object of the invention is to provide a process of oxidizing carbon compounds with nitric acid, which increases the speed and economy of the reaction and the quality of oxidation.

Another object of the invention is to provide an apparatus for the speedy and economic oxidation of carbon compounds.

A further object is to provide a process of manufacturing oxalic acid from rice hulls.

The invention possesses other advantageous features, some of which, with the foregoing, will be set forth at length in the following description, where I shall outline in full, the process of my invention and that form of apparatus which is shown in the accompanying drawing. It is to be understood that the process is not limited to any form of apparatus which may be employed in carrying it out, and also that the invention, in so far as the apparatus is concerned, is not limited to the showing made in the drawing, since the apparatus, as set forth in the claims, may be embodied in a plurality of forms. I shall confine the description of the process to the treatment of rice hulls, since I have had very successful results therewith, but it is to be understood that the invention is not limited to the treatment of rice hulls, since it may be advantageously employed on other carbon compounds.

The drawing is a vertical section, somewhat diagrammatic, of one form of apparatus which may be employed in carrying out the process.

The apparatus shown comprises a suitable vessel 2, preferably vertically elongated and having a conical lower end 3 terminating in a discharge opening, normally closed by the gate 4. The vessel is made of acid proof material and is formed to withstand the pressures produced therein. The vessel is closed at the top by the plate 5, to form a hermetically sealed chamber and is surmounted by a closed supply vessel 6 from which the material to be treated is fed into the processing vessel 2. The supply vessel is provided with means, such as the stirring rod 7, for maintaining the material in a state of agitation. Interposed between the vessels is a rotating valve 8, which is driven by the sprocket 9 to regularly introduce charges of material into the processing vessel, which is partly filled with acid. Arranged in the vessel 2 is a heating element, such as the vertically disposed steam coil 12 and disposed within the coil is an open ended tube 13, having a baffle plate 14 positioned above its upper end. Opening into the lower end of the tube 13 is a pipe 15 from which gas under pressure discharges into the tube, raising the mixture of solids and liquid therein and causing it to strike the baffle plate and fall back, as a spray, into the liquid in the vessel. By this means, the mixture is constantly agitated and circulated. The gas used for this purpose may be air, oxygen or a mixture of ozygen and nitrogen. The vessel is provided with a safety valve 11, and a gas outlet 16 and with a pressure gauge 17 mounted on a bent tube 18 which is charged with oil at the bend to prevent the gases and vapors in the vessel from contacting with the pressure gauge. All parts of the apparatus with which the acid, vapors or gases contact are formed of suitably resistant material. The tube 18 is provided with a branch connection 19 for the introduction of water or acid to the vessel and for relieving the pressure therein in the event that the other pressure relieving devices fail to function. The vessel is also provided with a thermometer or pyrometer holder 21 and with a sampling connection 22.

The acid employed in the process is nitric acid and, during the process, nitric oxides are formed in the vessel and these oxides and air and other gases discharge from the vessel through the conduit 16 to any suitable system for fully oxidizing, condensing, absorbing, regenerating or recovering the nitric acid used or such part thereof as does not combine with the carbon compound.

In carrying out the process on rice hulls, the hulls are first pulverized or otherwise finely divided and charged into the feed tank 6, and the processing vessel is charged to about ⅔ of its volume with strong nitric acid, preferably from 1.38 to 1.42 specific gravity. The vessel is then sealed and steam introduced into the steam coil to raise the temperature of the acid to a suitable temperature, for instance, between 60° and 80° centigrade. Air or oxygen or mixtures of nitrogen and oxygen is then introduced through the pipe 15 saturating the acid with more oxygen than nitrogen, because the oxygen is more soluble in the acid than the nitrogen. This is continued until a pressure of from 5 to 25 pounds per square inch is produced in the vessel and then the feed of gas is controlled to maintain the pressure substantially constant. The regular feed of the rice hulls is then begun, although they may have been introduced previously. The rice hulls are preferably introduced at a regular rate, although the rate may be varied or temporarily interrupted if the reaction is proceeding too rapidly. Under the conditions of temperature and pressure obtaining, the introduction of the rice hulls into the hot, agitated, oxygen bearing nitric acid, causes the carbon compounds, such as sugar, starch, cellulose and woody fiber, to be oxidized to oxalic acid and reduces the nitric acid to nitric oxide. If fructose is present among the carbon compounds, it will be oxidized to tartaric acid and glycollic acid.

Much of the nitric oxide liberated by the interaction of the carbon compounds and the oxygen bearing nitric acid is immediately regenerated in the liquid to higher oxides of nitrogen, such as $N_2O_3$ and $NO_2$ and consequently to nitrous and nitric acids to react with more carbon compounds. Part of the nitric oxide, released near the surface of the liquid, passes from the vessel through the conduit 16, together with some of the higher oxides of nitrogen, vaporized nitric acid, air, water vapor, etc., to a suitable recovery or regenerating system.

The amount of regeneration within the vessel depends somewhat on its height, which controls the length of the spray and the depth of the liquid, on its diameter and on conditions of temperature, pressure and the amount of oxygen forced into the vessel, and experience has shown a regeneration in the vessel of from 2% to 5% of the acid for each foot of height of the vessel. By these conditions greater speed of reaction is attained due to the acid being alternately reduced and regenerated in the presence of the carbon compounds. By these conditions also as the acid diminishes in concentration, the temperature tends to fall, but is kept up by the circulation of steam through the coil in contradistinction to conditions required for the oxidation of sulphur as set forth in United States Patent No. 1,150,787 of August 15, 1915, where strength of the acid and temperature must be kept down, whereas in this process they should be kept up. The concentration of the acid must fall as more material is oxidized (because some NO escapes all the time) but the temperature can and must be kept up to secure the greatest output of product. Samples are taken near the end of the run as shown by a decrease in the fumes or the yellow color of the gases issuing from the vessel through a glass lantern inserted in the line ahead of the recovery system. When the sample upon test shows that all of the nitric acid has been used up or the required low percentage reached, the feed of the material to the vessel is stopped. On the other hand if any undesirable amount of undigested carbonaceous material is present sufficiently more nithic acid may be added and the treatment thereof finished. Air or steam or both now may be blown through the mixture until practically all nitric oxide or other oxides or gases are blown out of the products, i. e., the solution of oxalic acid, undigested material if any, siliceous residue or other material. This generally takes ten to twenty minutes. A digestion generally takes about two to three hours. The discharge gate may now be removed and the contents run into a settling tank where most of the sediment settles and the decanted liquor run through a suitable filter and treated for its product of oxalic acid by crystallization or precipitation in standard manner, or it may be run directly and immediately through a filter and so treated. Under these conditions of digestion very high yields of oxalic acid, tartaric acid or other products are obtained and very little nitric acid need be lost. As high a rate as 1040 lbs. of oxalic acid can be obtained from a ton of rice hulls.

I have described the process as used in the treatment of rice hulls, but it may also be advantageously used in the treatment of other carbon compounds. On such materials as I have practiced the process, no other carrier or catalytic agent was necessary, but for some organic materials, such as the more inactive ones like the paraffines or oils or the heavier ones with asphalt bases, the addition of a small amount of a suitable carrier or catalytic agent such as ferric, vanadic or molybdic salts or vanadic, molybdic or sulphuric acids, or other like compounds, may be of service in inaugurating or increasing the speed of the reactions, or both.

I claim:

1. The process of treating carbo-hydrates which comprises agitating in a closed vessel with a gas containing oxygen, a hot mixture of the carbo-hydrate and nitric acid under pressure whereby nitric oxide is formed and a portion of the nitric oxide is reconverted into nitric acid in the vessel.

2. The process of treating carbo-hydrates which comprises agitating in a closed vessel with an oxygen containing gas, a hot mixture of finely divided carbo-hydrate and nitric acid saturated with oxygen whereby the nitric acid formed is converted to nitrous oxide in the vessel.

3. The process of treating carbo-hydrates which comprises agitating in a closed vessel with an oxygen containing gas, a hot mixture of finely divided carbo-hydrate and nitric acid saturated with oxygen, and maintaining the mixture under pressure, whereby nitric oxide is formed and a portion of the nitric oxide is reconverted into nitric acid.

4. The process of treating carbo-hydrates which comprises dropping the carbo-hydrate in finely divided form into agitated hot nitric acid saturated with oxygen and maintained under pressure.

5. The process of treating carbo-hydrates which comprises agitating in a closed vessel a mixture of the carbo-hydrate and nitric acid by an oxygen containing gas whereby nitric acid is formed and maintaining the mixture under such conditions as temperature and pressure that a portion of the nitric oxide is reconverted into nitric acid in the vessel.

6. The process of treating carbo-hydrates which comprises agitating with a gas containing oxygen, a hot mixture of nitric acid and finely divided carbo-hydrate under pressure, and maintaining the temperature of the mixture between 60° and 80° centigrade.

7. The process of producing oxalic acid which comprises agitating rice hulls with hot nitric acid under pressure and saturated with oxygen and separating oxalic acid from the resultant liquor.

8. The process of treating carbo-hydrates, which comprises agitating with a gas containing oxygen, a hot mixture of nitric acid saturated with oxygen and the carbo-hydrates under pressure and removing nitric oxide from the resultant liquor.

9. The process of producing oxalic acid, which comprises dropping finely divided rice hulls into a hot oxygen saturated nitric acid maintained under pressure, agitating the mixture with an oxygen containing gas and separating oxalic acid from the resultant liquor.

In testimony whereof, I have hereunto set my hand.

FORREST J. RANKIN.